United States Patent [19]

Koyama

[11] Patent Number: 5,152,888
[45] Date of Patent: Oct. 6, 1992

[54] APPARATUS FOR TREATMENT OF ORGANIC WASTE WATER AND CONTACTOR FOR USE THEREIN

[75] Inventor: Toichiro Koyama, Kawanishi, Japan
[73] Assignee: Net Co., Ltd., Japan
[21] Appl. No.: 782,393
[22] Filed: Oct. 24, 1991
[51] Int. Cl.$^5$ ............................................. C02F 3/02
[52] U.S. Cl. ................... 210/195.3; 210/208; 210/209; 210/219; 210/221.2
[58] Field of Search ............... 210/629, 620, 621, 194, 210/195.3, 198.1, 199, 205, 207, 208, 209, 218, 219, 220, 221.1, 221.2

[56] References Cited

U.S. PATENT DOCUMENTS 4,648,973  3/1987  Hultholm et al. ............. 210/629
4,680,119  7/1987  Franklin .......................... 210/629

*Primary Examiner*—Frank Sever
*Attorney, Agent, or Firm*—Barnes, Kisselle, Raisch, Choate, Whittemore & Hulbert

[57] ABSTRACT

An apparatus for treating organic waste water including a treating tank equipped with oscillatable submerged type contactors in which the organic waste water is treated. A top mixer is disposed under water in a top portion of the treating tank for creating a current of water in agitated condition. Pipe mixers are disposed below the top mixer, each pipe mixer including a pipe which is open at both ends and a band-like agitating blade fitted in the pipe and having a baffle plate portion. One end opening of each pipe mixer is positioned below the top mixer and the other end opening thereof is positioned in a lower portion of the treating tank, so that the current of water from the top mixer can pass through the pipe mixer from the one end opening toward the other end opening and can be discharged from the other end opening. An air feeder pipe extends from an external source to a position intermediate between the water-current generating top mixer and the pipe mixers, the tip of the feeder pipe being open at the intermediate position.

5 Claims, 7 Drawing Sheets

FIG. 9
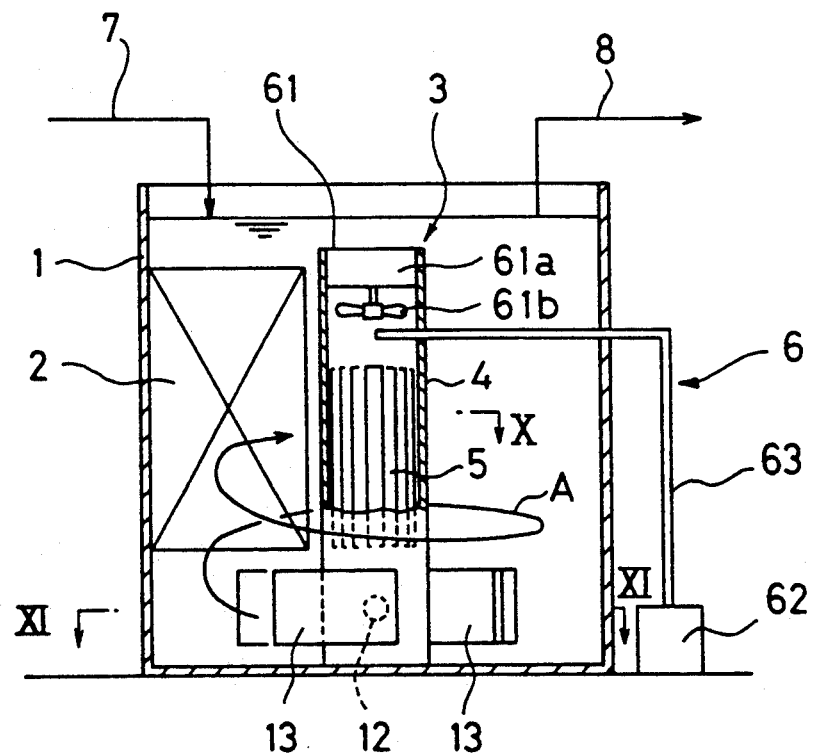
FIG. 10
FIG. 11
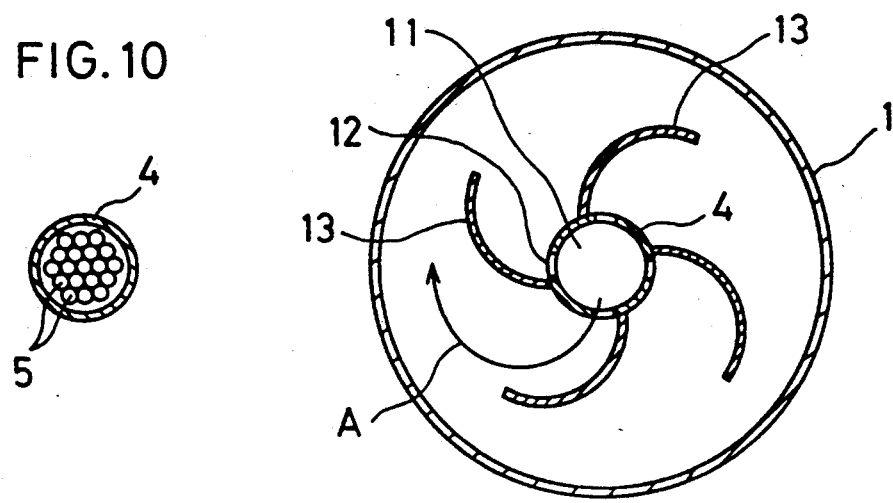

APPARATUS FOR TREATMENT OF ORGANIC WASTE WATER AND CONTACTOR FOR USE THEREIN

FIELD OF THE INVENTION

This invention relates to an apparatus for treatment of organic waste water, such as domestic liquid refuse or sewage, and to a contactor for use therein.

BACKGROUND OF THE INVENTION

Known apparatus for treatment of such organic waste water are generally of the type including a treating tank, contactors disposed in the tank for causing micro-organisms to be carried thereon, and an air diffuser pipe placed at the bottom of the treating tank which is connected to a blower. Air is blown from the diffuser pipe into the treating tank to supply oxygen to micro-organisms carried on the contactors and produce a bubble current, so that the waste water in the treating tank is treated while being agitated by the bubble current.

With the bubble current alone, however, a satisfactory current of water will not develop which is sufficient to agitate the waste water. As such, no efficient dissolution of oxygen can be expected and, in addition, contactors are likely to be blocked off by sludge. With the prior art arrangement, therefore, it is impracticable to expect that waste water treatment can be satisfactorily carried out.

SUMMARY OF THE INVENTION

Accordingly, it is a primary object of the invention to provide an apparatus for treatment of organic waste water which can generate satisfactory water currents capable of producing sufficient agitation effect and can thus satisfactorily perform waste water treatment, and a contactor for use in the apparatus.

In order to accomplish this object, according to the invention there is provided an apparatus for treating organic waste water including a treating tank equipped with contactors in which the organic waste water is treated, comprising:

water current generating means disposed under water in a top portion of said treating tank for generating a current of water in agitated condition, pipe mixer means disposed below said water current generating means and comprising a pipe and a band-like agitating blade fitted in the pipe, said agitating blade having a baffle plate portion, said pipe mixer means being open at one end and at the other end, said one end opening being positioned below said water current generating means, said other end opening being positioned in a lower portion of said treating tank, whereby the water current from said water current generating means can pass through said pipe mixer means from said one end opening toward said other end opening and is allowed to be discharged from said other end opening, and air feeder pipe means extending from an external location to a position intermediate between said water current generating means and said pipe mixer means and opening at said intermediate position.

According to the invention there is also provided a first contactor for use in said organic waste-water treating apparatus by being submerged in the waste water to be treated and which is adapted to cause micro-organisms to deposit thereon for treatment of the waste water through microbial action, comprising:

a core member which is not liable to microbial deposition, and a multiplicity of fringed threads made of a material which is likely to attract micro-organisms, said multiplicity of fringed threads projecting radially from said core member over its length, said fringed threads being pivotable about said core member.

Further, according to the invention there is provided a second contactor for use in said organic waste-water treating apparatus by being submerged in the waste water to be treated and which is adapted to cause micro-organisms to deposit thereon for treatment of the waste water through microbial action, wherein:

said contactor is made of a mixture material comprising conventional fibers, heat-shrinkable fibers, and heat-weldable fibers and is heat treated.

According to the foregoing arrangement of the organic waste water treating apparatus, the waste water introduced into the treating tank is caused to flow downward while it is agitated by the water current generating means, and air is blown from an external source into the tank at a position below the water current generating means. Thus, the air and waste water are supplied to the pipe mixer means, and in the course of their passage through the pipe mixer means, the air and waste water are well agitated and mixed, then discharged from the pipe mixer means into the treating tank. In other words, the process of water current generation and the process of air/waste water mixing and oxigen dissolution are separately carried out by the water current generating means and the pipe mixer means respectively. This provides for highly efficient oxygen dissolution. The mixture current discharged at the bottom of the tank is allowed to flow upward in the tank at a relatively high velocity, and this enables efficient waste-water treatment by means of the contactors. Air from an external source is fed into the treating tank at a position below the water current generating means disposed in a top portion of the tank, or at a position where the depth of waste water is relatively small and where the water pressure is relatively low; therefore, the air blow pressure required is low, which means reduced power requirement of the blower.

The lower end portion of the pipe mixer means may be arcuately bent in plan view. In another form of the invention, guide plate means may be provided at the bottom of the tank for guiding the water current discharged from the lower end of the pipe mixer means in a peripheral direction of the tank. Through such arrangements, the mixture current is caused to flow in spiral fashion within the tank. This results in longer-time residence in water of fine bubbles produced within the pipe mixer means, which leads to further enhancement of oxygen dissolving efficiency.

The first contactor is advantageous in that sludge will not be caught by the core member for deposition thereon, there being no possible jamming by sludge in the proximity of the core member, while sludge can be reasonably caught by fringed threads for deposition thereon as the fringed threads are pivoted. The fringed threads are adapted to be pivoted under the influence of waste-water currents within the treating tank so that no excessive deposition of sludge will be effected. Therefore, sludge pickup by the fringed threads can be limited to an optimum level and thus the treating function of micro-organisms can be well enhanced. Possibility of bulk peel due to excessive sludge deposition is eliminated, with the result that water quality fluctuations can be positively prevented.

The second contactor is made from a mixed spun thread material which is heat treated, which provides bulky effect and fine voids. This insures improved sludge pickup.

BRIEF DESCRIPTION OF THE DRAWINGS

FIG. 9 is a sectional view showing a schematic construction of an apparatus for treatment of organic waste water representing another embodiment of the invention;

FIG. 10 is a section taken along lines X—X in FIG. 9;

FIG. 11 is a section taken along lines XI—XI in FIG. 9;

DESCRIPTION OF THE PREFERRED EMBODIMENTS

Figure 1:
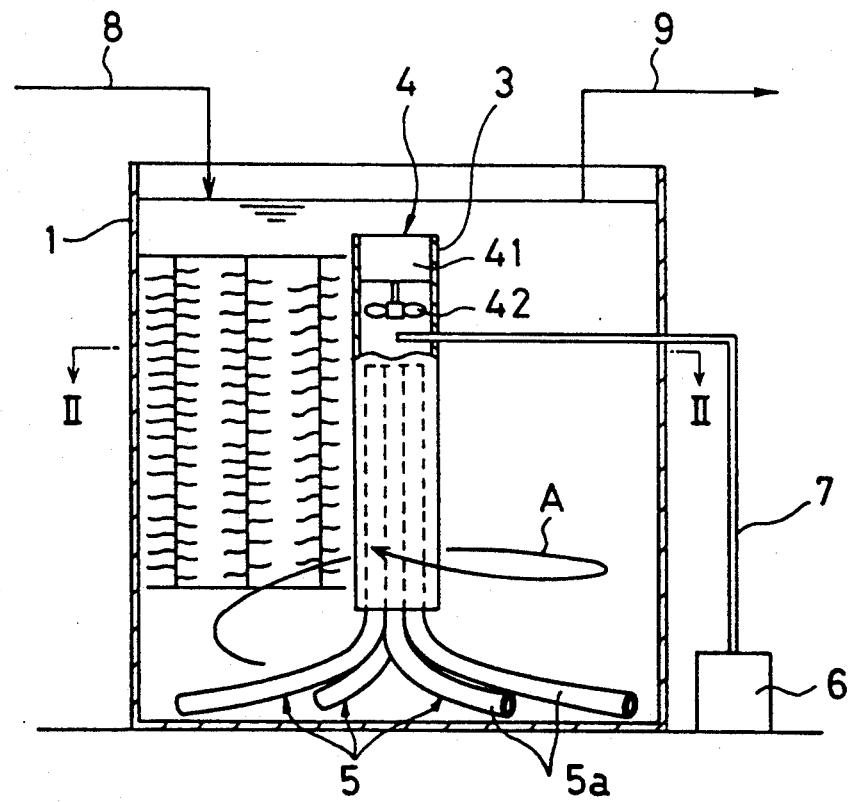
FIG. 1 is a sectional view showing a schematic construction of an apparatus for treatment of organic waste water representing one embodiment of the invention.
Figure 2:
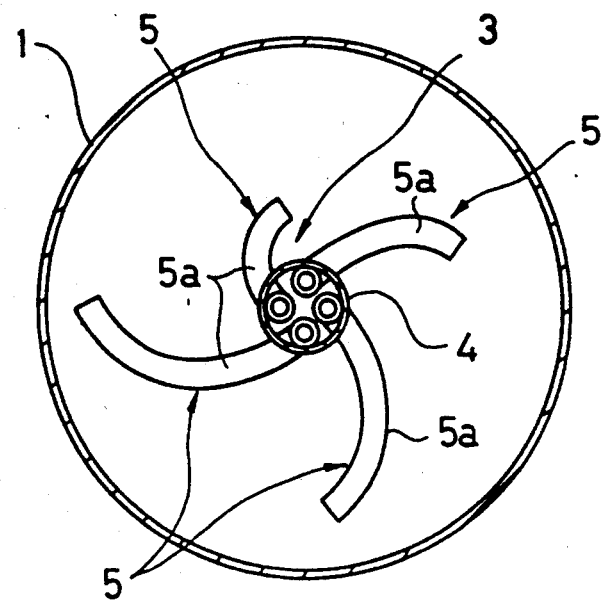
FIG. 2 is a section taken along lines II—II in FIG. 1.

Referring to FIGS. 1 and 2, there is shown a treating tank 1 of cylindrical shape in which are disposed a plurality of contactors 2 for causing micro-organisms to be carried thereon. In a center portion of the treating tank 1 is disposed an inner cylinder 3 which extends vertically from a locaction adjacent the top end of the tank 1 to a location adjacent the bottom thereof and which is open at its both ends. A top mixer 4 for generating a water current is mounted in the inner cylinder 3 at the top end thereof. A plurality of vertically extending pipe mixers 5 are disposed below the top mixer 4, each of the pipe mixers 5 being open at its upper and lower ends. Lower end portions 5a of the pipe mixers 5 project from the lower end of the inner cylinder 3 and are arcuately bent as viewed in plan, terminating respectively in discharge ports positioned at the bottom of the treating tank 1 which are oriented in same peripheral direction. A blower 6 is disposed outside the treating tank 1, and an air feeder pipe 7 extends from the blower 6, a forward end portion of the air feed pipe 7 being conducted into the treating tank 1 in which it is open between the top mixer 4 at the top of the inner tube 3 and the upper ends of the pipe mixers 5. Shown by numeral 8 is a supply pipe for supply of waste water into the treating tank 1, and shown by 9 is a collector pipe for removal of treated water from the treating tank 1.

The top mixer 4 comprises a motor 41 mounted at the top end of the inner cylinder 3, and an impeller 42 adapted to be driven by the motor 41 into rotation. The forward end portion of the feeder pipe 7 is open at a level slightly below the impeller 42. The motor 41 is disposed under water as shown, or alternatively it may be disposed suitably above the water level.

Figure 3:
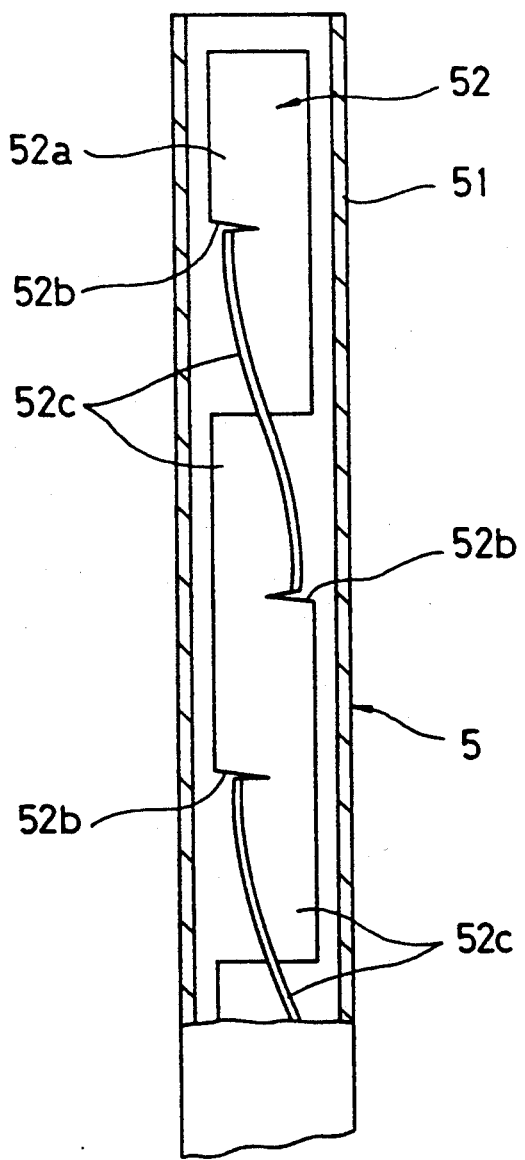
FIG. 3 is an enlarged sectional view of a pipe mixer used in the apparatus shown in FIG. 1.

Each pipe mixer 5, as shown in FIG. 3, comprises a flexible pipe 51 and a stationary band-like agitating blade 52 fitted in the pipe 51. The agitating blade 52 has notches 52b spaced longitudinally of a metal band plate 52a in staggered relation which are cut inward alternately from transverse opposite edge sides to a point near the middle of the width of the band plate, the band plate 52a being twisted in one direction about the widthwise middle thereof to form a plurality of integral baffle plate portions 52c spirally curved along the length of the band plate 52a.

Figure 4:
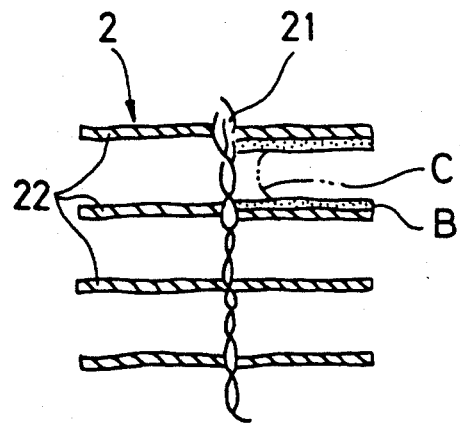
FIG. 4 is a fragmentary enlarged front view of a contactor seen in FIG. 1.
Figure 5:
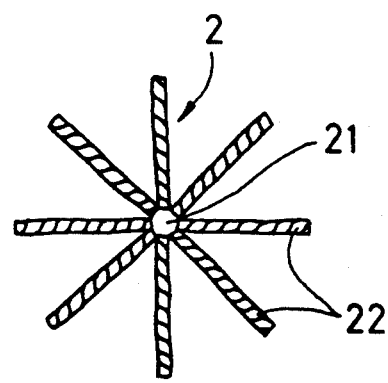
FIG. 5 is a plan view of the contactor of FIG. 4.

FIGS. 4 and 5 illustrate the construction of one form of contactor 2 in detail. The contactor 2 comprises a core member 21 formed of an antimicrobial material which is not liable to microbial deposition, and a multiplicity of fringed threads 22 which are liable to microbial deposition, the fringed threads 22 projecting radially from the core member 21 over the length of the core 21, the fringed threads 22 being pivotable about the core member 21. A multiplicity of such contactors 2 are vertically suspendedly arranged in the treating tank 1 around the inner cylinder 3.

The core member 21 which is unlikely to attract micro-organisms is comprised of, for example, intertwined antimicrobial fibers, antibacterial copper wires, conventional fibers with an antibacterial agent deposited thereon at a post-forming stage, or such material as monofilament which is not liable to microbial deposition. Fringed threads 22 which are likely to attract microorganisms are made from, for example, fibers having a rough surface or high-bulk fibers having large voids. Fringed threads 22 may be fabricated in such a way that any of the aforesaid fiber materials is mixed with a thermally fusible fiber material, the mixture being heat treated at a post-forming stage; thus, the fringed threads 22 have moderate rigidity so that they are so hard and taut as to be pivotally moved by a liquid waste current generated in the treating tank 1.

Figure 6:
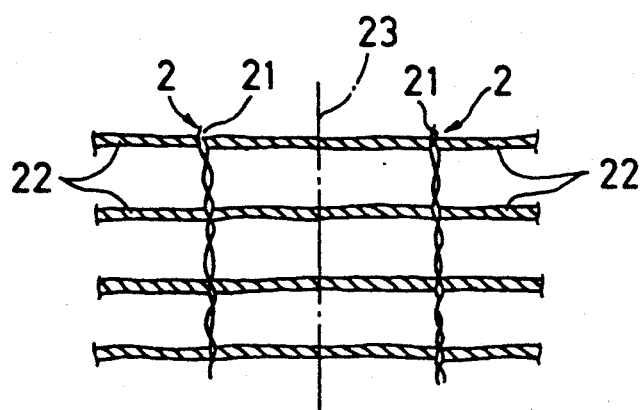
FIG. 6 is a view showing the process of making the contactor.

In the process of fabricating such contactor 2, as FIG. 6 shows, a plurality of core members 21 and a plurality of fringed threades 22 are woven together into a doup-weave form, individual fringed threads 22 being cut midway between adjacent core members 21, or at 23 as shown. Then, core member 21 is twisted in one direction to cause fringed threads 22 to project radially, and where required, heat setting treatment is carried out for configurational fixing.

Operation of the waste water treating apparatus of the above described arrangement will be explained.

The waste water which is supplied from the supply pipe 8 into the treating tank 1 is taken into the inner cylinder 3 through the upper end opening thereof and is transferred downward while being agitated by the impeller 42 of the top mixer 4. During this downward transfer, air is blown into the waste water, at a location below the top mixer 4, from the blower 6 through the feeder pipe 7. Thus, air and waste water are supplied into individual pipe mixers 5 and, in the course of their passing through the pipe mixers, the air and waste water are well agitated and mixed together by means of baffle plates 52c of each agitating blade 52.

Since the air from the blower 6 is blown into an upper portion of treating tank 1 at a location immediately below the top mixer 4, that is, a location where the pressure of the waste water is relatively small, air blowing under small discharge pressure is possible, which permits the power requirement of the blower 6 to be minimized.

Mixture currents are discharged circumferentially from lower end portions 5a of individual pipe mixers 5 at the bottom of the treating tank 1 and are then transferred upward within the treating tank 1 in the form of a spirally agitated current A. In this way, waste water treatment is effected by micro-organisms carried on individual contactors 2 while oxygen is supplied to the micro-organisms.

Lower end portions 5a of the pipe mixers 5 are arcuately bent as viewed in plan so that their terminal discharge ports at the bottom of the treating tank 1 are oriented in same peripheral direction, and this provides for creation of such spirally agitated upward current A as mentioned above. Therefore, residence time of bubbles in the waste water is extended so that mixture currents discharged from individual pipe mixers 5 and the waste water in the treating tank 1 can be more satisfactorily mixed, thus resulting in increased efficiency of oxygen dissolution. Waste water with such high efficiency of oxygen dissolution is supplied to micro-organisms carried on the contactors 2 and accordingly waste water treatment is carried out at high efficiency.

At each contactor 2, as FIG. 4 shows, sludge B carried in agitated liquid current A is caught by and caused to deposit on the contactor 2 where the sludge B is treated through digesting action of micro-organisms present on the contactor 2. Since the core member 21 of the contactor 2 is made of an anti-bacterial material which is not liable to microbial deposition, while the fringed threads 22 are made of a material which is likely to attract micro-organisms, sludge B is reasonably caught by the fringed threads for deposition thereon, and not by the core member. Especially because the contactor 2 is so designed that its component fringed threads 22 may be pivoted under suitable tension by waste water current in the treating tank 1 so as not to allow sludge B to be excessively carried thereon, an optimum amount of sludge may be deposited on the fringed threads 22.

More concretely, assuming that sludge B should be caught by and allowed to deposit on the core member 21, it would extend between adjacent fringed threads 22 in a bridging fashion to cause jamming as shown by phantom line C in FIG. 4 and, as a consequence, not only would treating action of micro-organisms be adversely affected, but also there would occur bulk peeling due to sludge B overloading. Through adoption of the foregoing arrangement, however, it is possible to allow an optimum amount of sludge B to deposit on the fringed threads 22 and thus to enhance treating action of micro-organisms. At same time, bulk peeling of sludge B is prevented, whereby fluctuations in water quality, as well as fluctuations in the treating capacity due to such quality fluctuations, can be positively prevented. Preferably, fringed threads 22 are varied in material, length, hardness, density, etc. according to such factors as the nature of the sludge, aeration intensity, the intensity of supplementary water current, and characteristics of waste water.

Examples of waste water treatment using such form of contactor 2 as described above will be explained.

EXAMPLE 1

Figure 7:
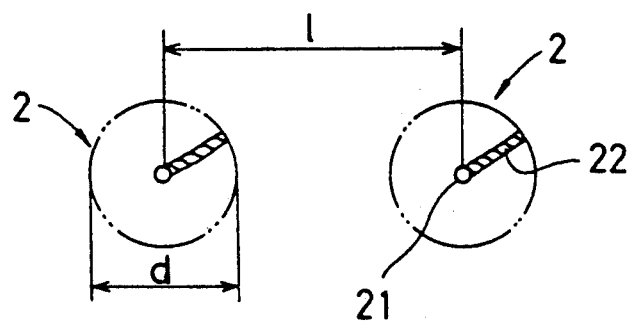
FIGS. 7 and 8 are views showing by way of example forms of the contactor.

A plurality of contactors 2, each of a low density soft type having a diameter d of 100 mm, which are each spaced a distance l of 200 mm from adjacent one, are arranged in treating tank 1 as shown in FIG. 7, and treatment tests were carried out. The contactors 2 exhibited a treatment capacity of the order of two times as much as that according to the known activated sludge treatment technique. Whereas the treating capacity according to the known method was found short of the requirement, the tests indicated that by virtue of the contactors 2, sludge production in the treating tank 1 was reduced and water quality was stabilized.

EXAMPLE 2

Figure 8:
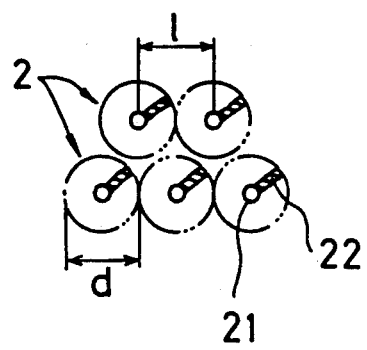

A plurality of contactors 2, each of a high density hard type having a diameter d of 50 mm, which are each spaced a distance l of 50 mm from adjacent one, are arranged in treating tank 1 as shown in FIG. 8, and treatment tests were carried out under supply of a waste water with aeration involved therein and a supplementary water current. In the tests, a much greater B O D volume loading value could be obtained as compared with that according to the known method, and waste water treatment could be carried out at high efficiency.

FIGS. 9 to 11 illustrate another embodiment of the invention. In this embodiment, the pipe mixers 5 are housed, over their entire length, in the inner cylinder 3, and in the interior of the inner cylinder 3 there is formed a space 11 below liquid discharge ports of the pipe mixers 5 at the lower end of the inner cylinder 3. The space 11 is in communication through a plurality of discharge ports 12 with the exterior of the inner cylinder 3 at the bottom of the treating tank 1. Guide plates 13 are disposed on the outer surface of the inner cylinder 3 in the vicinity of the outlet ports 12. Each of the guide plates 13 is connected at its base end to the inner cylinder 3 and is arcuately bent in plan view so that, as in the embodiment shown in FIGS. 1 and 2, mixture currents from the discharge ports 12 may be guided so as to form an agitated spiral current A.

With such arrangement, it is possible to expect such satisfactory effect of mixing as described with respect to the foregoing embodiment.

Figure 12:
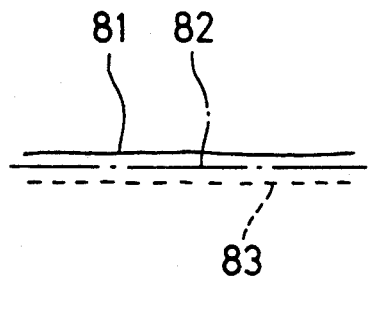
FIG. 12 is a schematic view showing a model for the yarn material of another form of contactor according to the invention.
Figure 13:
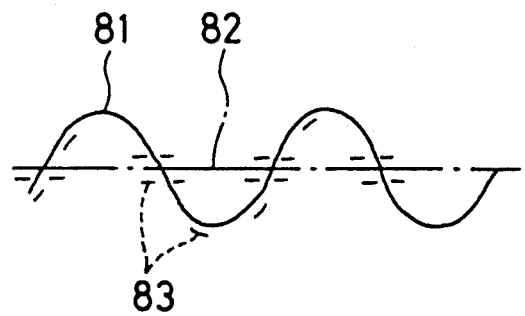
FIG. 13 is a view showing the yarn material of FIG. 12 which has been heat treated.

FIGS. 12 to 16b illustrate another form of contactor 12 according to the invention. FIG. 12 shows a model for a yarn material of the contactor which is spun from a mixture of ordinary cotton 81, heat-shrinkable fiber 82, and heat-weldable fiber 83. When the yarn material is made into thread or fabric form and heat treated, as FIG. 13 shows, the heat-shrinkable fiber component 82 is shrunk to give bulkiness and the heat-weldable fiber component 83 is fused to fix the twist and give a suitable degree of rigidity. By changing the blend ratio of the ordinary cotton 81, heat-shrinkable fiber 82, and heat-weldable fiber 83, it is possible to fabricate a contactor suitable for the desired use.

Figure 14:
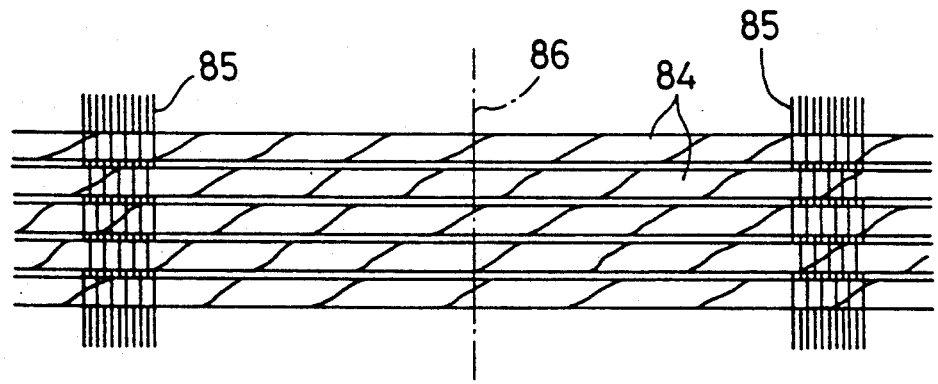
FIGS. 14, 15a, 15b, 16a and 16b are views showing stages of making a contactor from the yarn material shown in FIGS. 12 and 13.
Figure 15A:
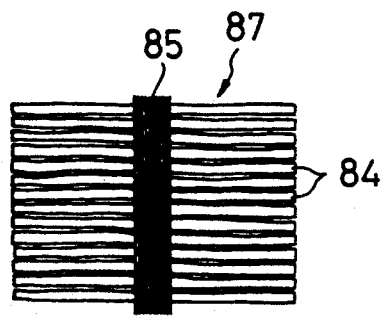
Figure 15B:
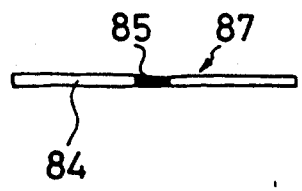

Threads thus heat treated are then formed into thick weft threads 84 as shown in FIG. 14, and the weft threads 84 are partially interlaced with thin warp threads 85 to form a fabric as shown. Then, the fabric is cut centrally between adjacent groups of warp threads 85 and along a cut line 86 in same way as shown previously in FIG. 6, whereby a contactor forming unit material 87 is obtained as shown in FIGS. 15a and 15b.

Figure 16A:
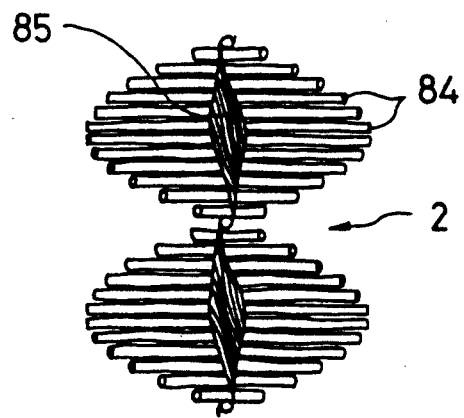
Figure 16B:
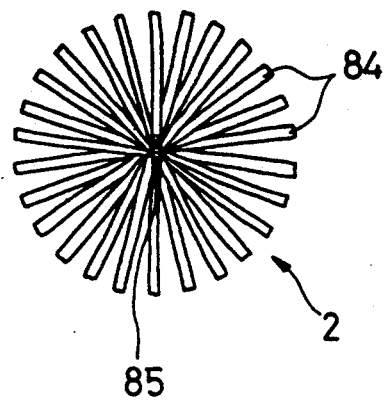

Since twist fixing is effected by means of the heat-weldable fiber component 83 of the threads as stated above, "raveling" of the cut portion can be effectively prevented. The unit material 87 is then twisted about the warp threads 85, whereby individual weft threads 84 are helically arranged around warp threads 85 so as to be allowed to project radially as shown in FIGS. 16a and 16b, so that a contactor 2 of a fringed structure can be obtained wherein individual weft threads 84 are independently oriented relative to one another. Such helical and radial pattern of threads is same as that shown in FIGS. 4 and 5.

More particularly, weft threads 84 are arranged about the warp threads 85 in a fringed fashion and are made self-sustaining as such through heat setting and otherwise, so that when the contactor is placed in the waste water to be treated, individual weft threads 84 having a suitable degree of rigidity are independently present in the waste water to provide increased area for sludge deposition.

Furthermore, as FIG. 13 shows, the threads have become bulky as a result of heat treatment, with a multiplicity of fine voids formed therein to present increased surface area. Thus, considerable improvement can be obtained in sluge depositing performance to enable higher load treatment. In addition, improved retention of sludge loading can be achieved.

Weft threads 84 are fixed at the middle thereof to the warp threads 85 and, therefore, they are free at their both ends. As such, the weft threads 84 are pivotable under the force of water currents in the waste water treatment apparatus. Accordingly, as is the case with the embodiment shown in FIGS. 4 through 8, any excessive amount of sludge deposited on the surface of the threads is washed away, and thus only a relatively limited amount of sludge can be retained on the contactor. Therefore, any such unfavorable occurrence that sludge deposit jams the voids in the weft threads 84 to produce anaerobic condition that will adversely affect microbial activity can be positively prevented. The contactor is free from the possibility of interthread blocking by sludge and thus constantly stable and highly efficient waste-water treatment can be achieved.

The design of threads can be altered as desired in respect of bulkiness, voids, thickness, hardness, density, etc. according to the fibers selected for use, blend ratio, yarn counts, weave, knit structure, heat treating conditions, and other processing conditions involved. Therefore, advantageous conditions may be suitably set according to the nature of the waste water to be treated, and performance characteristics of the treatment equipment to be employed.

Figure 17:
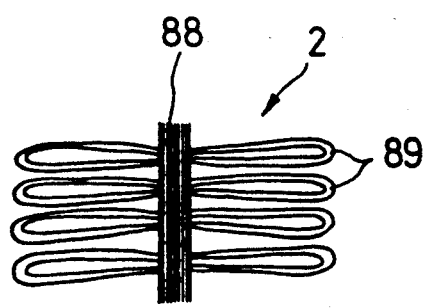
FIG. 17 is a view showing a still another form of contactor according to the invention.

FIG. 17 shows another form of the contactor 2 according to the invention. In this embodiment, a knit structure as shown is employed in which loop-form threads 89 project radially from center threads 88. In making a contactor of such structure, it is only necessary to knit a fabric as shown and twist same into shape, and the stage of cutting as in the foregoing embodiment is not required. Therefore, possible "raveling" due to cutting can be positively prevented. Where structural characteristics assure suitable rigidity, use of heat-weldable fibers may not be required.

In the above described embodiments, each contactor 2 is such that the threads are of the fringed type in which individual threads project radially outwarly. However, it is understood that the contactor of the invention is not limited to such form. In usual waste-water treatment equipment which often includes a plurality of treating tanks arranged stage by stage, for example, the fringed type contactor of the invention can be advantageously employed particularly in the first-stage tank in which the concentration of organic substances is high, but contactors of the fringed type may not always be used in subsequent stage tanks in which the concentration of organic substances is low. In tanks of low organic concentration, it may be desirable to employ contactors of other suitable form.

What is claimed is:

1. An apparatus for treating organic waste water comprising:
    a treating tank,
    an inner cylinder having open ends, said inner cylinder being disposed in the central portion of said treating tank and extending vertically from a location adjacent a top end of said treating tank to a location adjacent a bottom of said treating tank,
    a plurality of contactors carrying micro-organisms, said contactors being arranged in said treating tank and around said inner cylinder,
    water current generating means disposed under water in a top portion of said inner cylinder for generating a downward current of water in agitated condition,
    pipe mixer means disposed below said water current generating means and comprising a plurality of pipes and a band-like agitating blade fixedly mounted within each of said pipes, said agitating blades each having a plurality of spirally twisted baffle plate portions,
    said pipe mixer means being open at one end and at the other end, said one end opening being positioned below said water current generating means, said other end opening being positioned in a lower portion of said treating tank, whereby the water current from said water current generating means can pass through said pipe mixer means from said one end opening toward said other end opening and is allowed to be discharged from said other end opening, and
    air feeder pipe means extending from an external location to an intermediate position between said water current generating means and said pipe mixer means and opening at said intermediate position.

2. An apparatus for treating organic waste water as set forth in claim 1, wherein said contactors comprise:
    a core member which is not liable to microbial deposition, and a multiplicity of fringed threads made of a material which is likely to attract micro-organisms,
    said multiplicity of fringed threads projecting radially from said core member over its length, said fringed threads being pivotable about said core member.

3. An apparatus for treating organic waste water as set forth in claim 1, wherein said contactors are made of heat-treated mixed yarn comprising conventional fibers, heat-shrinkable fibers, and heat-weldable fibers.

4. An apparatus for treating organic waste water as set forth in claim 1, wherein said pipe mixer means has a portion terminating at said other end opening located at the bottom of said tank for discharge of the water current which is arcuately bent as viewed in plan so as to guide the discharged water current in a peripheral direction of said tank.

5. An apparatus for treating organic waste water as set forth in claim 1, further comprising guide plate means disposed at the bottom of said tank for guiding the water current discharged from said other end opening of said pipe mixer means in a peripheral direction of said tank.

* * * * *